United States Patent
Mangano et al.

(10) Patent No.: US 8,677,045 B2
(45) Date of Patent: Mar. 18, 2014

(54) TRANSACTION REORDERING SYSTEM AND METHOD WITH PROTOCOL INDIFFERENCE

(75) Inventors: Daniele Mangano, Messina (IT); Ignazio Antonino Urzi, Voreppe (FR)

(73) Assignees: STMicroelectronics (Grenoble 2) SAS, Grenoble (FR); STMicroelectronics S.r.l., Agrate Brianza (IT)

( * ) Notice: Subject to any disclaimer, the term of this patent is extended or adjusted under 35 U.S.C. 154(b) by 53 days.

(21) Appl. No.: 13/241,874

(22) Filed: Sep. 23, 2011

(65) Prior Publication Data

US 2012/0079154 A1   Mar. 29, 2012

(30) Foreign Application Priority Data

Sep. 29, 2010 (EP) .................... 10306058

(51) Int. Cl.
*G06F 13/36* (2006.01)
*G06F 13/40* (2006.01)

(52) U.S. Cl.
CPC ................. *G06F 13/4059* (2013.01)
USPC ....................... 710/310; 710/305

(58) Field of Classification Search
USPC ........... 710/305–315, 8–19, 107–119, 53–61
See application file for complete search history.

(56) References Cited

U.S. PATENT DOCUMENTS

| | | |
|---|---|---|
| 5,930,485 A | 7/1999 | Kelly |
| 6,108,345 A | 8/2000 | Zhang |
| 6,292,807 B1 | 9/2001 | Larson |
| 6,571,332 B1 * | 5/2003 | Miranda et al. ............ 712/245 |
| 6,694,390 B1 | 2/2004 | Bogin et al. |
| 6,950,886 B1 | 9/2005 | Bailey |
| 7,047,374 B2 | 5/2006 | Sah et al. |
| 8,032,676 B2 | 10/2011 | Wingard et al. |
| 8,244,950 B2 | 8/2012 | Barth et al. |
| 8,316,194 B2 | 11/2012 | Adl-Tabatabai et al. |
| 8,520,675 B1 | 8/2013 | Frailong et al. |
| 2004/0019723 A1 | 1/2004 | Ostrovsky et al. |
| 2004/0068603 A1 | 4/2004 | Augsburg et al. |
| 2012/0036296 A1 | 2/2012 | Wingard et al. |
| 2012/0079148 A1 | 3/2012 | Urzi et al. |
| 2012/0207020 A1 | 8/2012 | Li et al. |

FOREIGN PATENT DOCUMENTS

| | | |
|---|---|---|
| EP | 2444903 | 4/2012 |
| WO | 0177843 | 10/2001 |
| WO | 2011095963 | 8/2011 |

OTHER PUBLICATIONS

European Search Report for European Application No. EP10306057, European Patent Office, Munich, Feb. 2, 2011, 5 pages.
European Search Report for European Application No. EP10306058, European Patent Office, Munich, Feb. 3, 2011, pp. 5.
International Search Report for Italian patent application No. TO20120470, The Hague, Feb. 18, 2013, 2 pages.
U.S. Appl. No. 13/904,379 entitled "Method for Handling Access Transactions and Related System", filed May 29, 2013, pp. 26.

* cited by examiner

*Primary Examiner* — Raymond Phan
(74) *Attorney, Agent, or Firm* — Graybeal Jackson LLP

(57) ABSTRACT

An embodiment of a transaction reordering arrangement is provided. The transaction reordering arrangement includes a queue into which respective responses to requests are writable and a controller configured to control a position in said queue to which said respective responses to said requests are written. The position is controlled such that the responses are read out of said queue in an order which corresponds to an order in which the requests are issued.

29 Claims, 7 Drawing Sheets

TRANSACTION REORDERING SYSTEM AND METHOD WITH PROTOCOL INDIFFERENCE

PRIORITY CLAIM

The instant application claims priority to European Patent Application No. 10306058.8, filed Sep. 29, 2010, which application is incorporated herein by reference in its entirety.

This application is related to the U.S. patent application Ser. No.: 13/248,316 entitled REORDERING ARRANGEMENT, filed Sep. 29, 2011, and which is incorporated herein by reference in its entirety; this application is also related to the U.S. patent application Ser. No. 13/904,379 entitled METHOD FOR HANDLING ACCESS TRANSACTIONS AND RELATED SYSTEM, filed May 29, 2013.

TECHNICAL FIELD

An embodiment relates to a transaction reordering arrangement and in particular, but not exclusively, to a transaction reordering arrangement for use in an integrated circuit.

BACKGROUND

Known integrated circuits may be provided with a plurality of masters which are configured to issue transaction requests. These transaction requests are then sent to a respective slave configured to provide responses to the respective requests. Some protocols require that a given master receive respective responses in the same order as the requests were issued.

Associative approaches using a content addressable memory have been proposed, but such approaches may be complex and take up a significant amount of silicon. These approaches may introduce a frequency limitation which can adversely affect the performance.

SUMMARY

According to an embodiment, there is provided a transaction reordering arrangement including: a queue into which respective responses to requests are writable; and a controller configured to control a position in said queue to which said respective responses to said requests are written such that said responses are read out of said queue in an order which corresponds to an order in which said requests are issued.

The arrangement may include: a first interface configured to receive said requests from at least one source of said requests and to provide said responses to a respective one of said at least one source; and a second interface configured to output said requests to at least one responder and to receive said responses from a respective one of said at least one responder.

The controller may be configured to add respective index information to said requests received via said first interface such that said requests output by said second interface include said index information.

The controller may be configured to add said respective index information to at least one of a custom information field and a source identification field of said request.

The controller may be configured to increment said index information for a successive request. Different parts of a request may include different index information respectively.

The controller may be configured to use said index information in said response to control the position in said queue to which said response is written.

The controller may be configured to remove said index information from said response.

The controller may be configured to control a mapping between said index information and a position in said queue.

The controller may be configured to provide a write pointer using said index information and information indicating a number of responses read out of said queue.

The queue may be configured such that said responses are read out of said queue from a head of said queue.

The queue may include a first-in-first-out structure.

When a response is read out of said queue, the contents of said queue may be shifted towards the head of said queue.

According to an embodiment, there is provided an integrated circuit including a transaction reordering arrangement including: a queue into which respective responses to requests are writable; and a controller configured to control a position in said queue to which said respective responses to said requests are written such that said responses are read out of said queue in an order which corresponds to an order in which said requests are issued.

The integrated circuit may included at least one request source configured to provide said requests and at least one responder configured to provide said responses to said requests, said transaction reordering arrangement being between said request source and said responder.

The at least one request source may included at least one master and said at least one responder may include at least one slave.

The integrated circuit may included a network on chip interconnect.

The transaction reordering arrangement may be provided at an interface of said network on chip interconnect and said at least one request source.

BRIEF DESCRIPTION OF THE DRAWINGS

For a better understanding of one or more embodiments, reference will be made by way of example only to the accompanying drawings in which.

DETAILED DESCRIPTION

Figure 1:
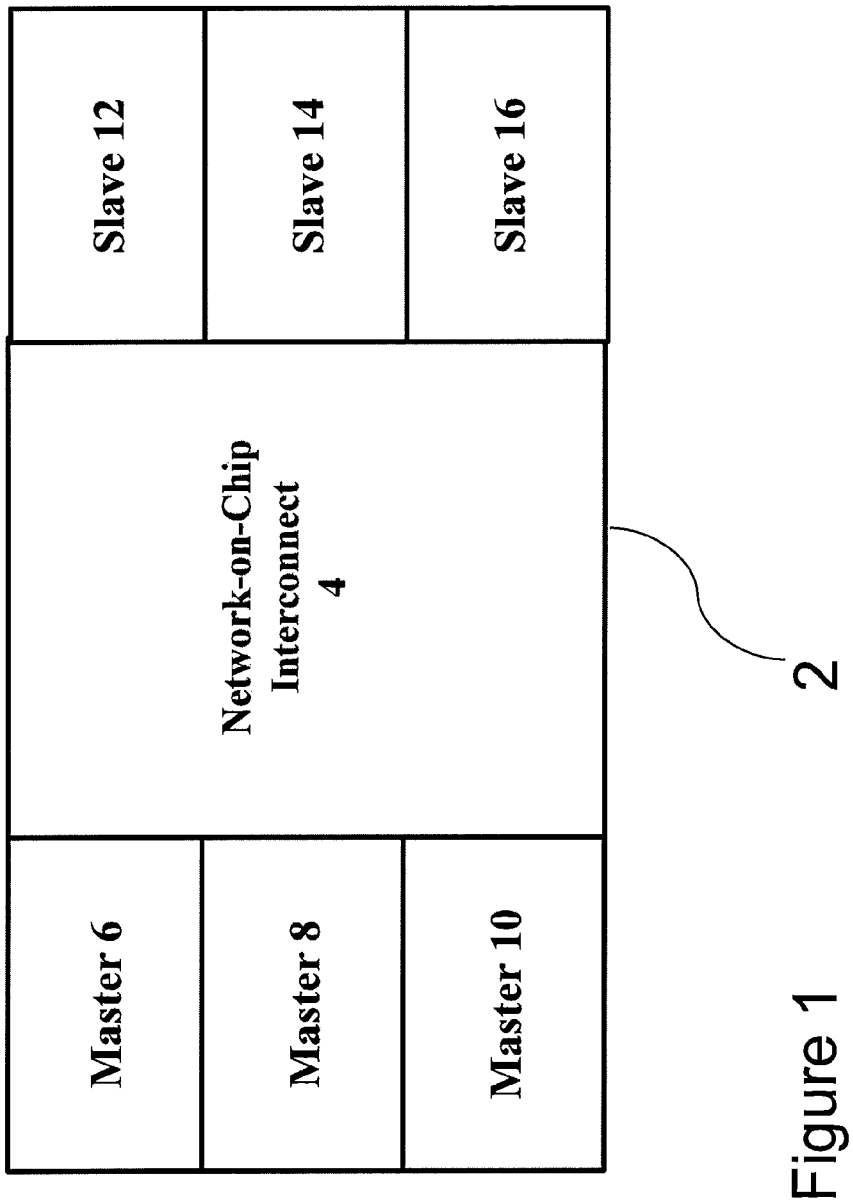
FIG. 1 shows schematically part of an integrated circuit according to an embodiment.

Reference is made to FIG. 1 which shows schematically part of an integrated circuit 2 according to an embodiment. The integrated circuit 2 is provided with a Network-on-Chip NoC interconnect 4. Attached to the NoC interconnect 4 is a first master 6, a second master 8 and a third master 10. The first master 6 is arranged to communicate via the Network-on-Chip interconnect 4 with a first slave 12. Likewise the second and third masters 8 and 10 are configured to communicate with second and third slaves 14 and 16 respectively via the NoC interconnect 4. In some arrangements, a master may communicate with more than one slave. In some arrangements, more than one master may communicate with the same slave.

In a system-on-chip SoC, performance in a communication between components may be addressed in order to implement advanced functionalities in application domains such as home digital video, set-top-box, HD TV (high definition television), 3D TV (three dimensional television), mobile and multimedia applications. It is appreciated that some embodiments may be used in such SoCs. It is appreciated that some of the embodiments may be used in different application domains to these specific examples.

Embodiments may be incorporated in one or more functional blocks, IP blocks, subsystems of coupled blocks or one or more integrated circuits. Embodiments may, for example, be provided in: set-top boxes; mobile phones; communication devices; computers; PCs; lap-tops; video equipment such as a DVD or CD player/recorder; media player/recorders; TVs; note books; smart phones; PDAs; or user equipment.

In some embodiments, IP cores or IP blocks are used. IP cores or blocks are reusable blocks which may be associated with some intellectual property of a party. Typically, these so-called IP blocks are reused and potentially licensed from different companies. There may of course be other reusable blocks which have no IP associated therewith. This reuse methodology is used by system-on-chip providers in order to facilitate the design of integrated circuits. However this may mean that two or more blocks on the same integrated circuit may be using different protocols and interfaces.

Generally, the interconnects may have to ensure the order of at least some response transactions is the same order as requested by the respective masters. These response transactions may be responses to requests each marked with a same identifier and issued by the same master. By way of example only, the protocols may include a manufacturer's own proprietary protocol, OCP (open core protocol), or AMBA AXI (Advanced Microcontroller Bus Architecture-advanced extensible interface). These three protocols are given by way of example only and it is appreciated that alternative embodiments may use any alternative or additional protocols.

With reference to FIG. 1, three masters are shown by way of example only. These masters can be considered to be initiators. Likewise, three slaves are shown. These slaves can be regarded as targets. In the example shown in FIG. 1, the masters and slaves communicate via the Network-on-Chip interconnect 4. In the example shown in FIG. 1, different ones of the masters and slaves use different protocols. The NoC interconnect 4 is configured to convert the traffic generated by the masters and slaves into a NoC protocol. It is sometimes referred to as the system "common" language. This function may be carried out by network interface components of the NoC interconnect. These components are not shown in FIG. 1.

The NoC interconnect 4 usually has to guarantee that the protocol constraints are met for all of the blocks. This may require the ordering of the response traffic. Some protocols such as AMBA AXI or OCP are based on the assumption that at least some response transactions are delivered to a respective master in the same order as the request transactions are issued by that master.

To meet this potential requirement, in some embodiments, it has been proposed that the interconnects and slaves deal with filtering and/or reordering. Filtering aims at preventing out of order whilst reordering aims at recovering out of order conditions. In some embodiments, to provide improved performance, reordering is applied and filtering is avoided. However, in some embodiments, this may mean that there is a large cost in terms of hardware complexity. Some circuits performing reordering may introduce degradation in a clock-operation frequency, which may effect performance.

Some arrangements make use of both reordering at the slave side and filtering. However, this may have disadvantages in that there may be a strong dependency on the specific system architecture, interconnect topology, protocols, block behavior, etc.

Accordingly, as will be described below, further embodiments may address one or more of the following: performance limitations; hardware complexity; and non-agnostic interconnect architecture. This latter issue may affect productivity and time to market because each time a new product is developed, the designers may have to deal with the order constraint, the architecture being arranged so as to avoid an out of order condition for a series of transactions.

Some embodiments allow the transactions to be processed out of order and a reordering mechanism may be provided at the interconnect level either in front of the initiator or at a suitable point within the interconnect.

As mentioned, two options for dealing with ordering constraints are filtering and reordering. Filtering may mean that it is not possible to fully exploit potential advantages of changing the order of accesses to the DDR (double data rate) memory subsystem. In some embodiments, a system-on-chip may have a performance improvement which can be achieved by changing the order of access to the DDR memory subsystem.

Accordingly, in some embodiments, only reordering is used. Some reordering circuitry for example arrangements based on an associative approach using content addressable memory (CAM) architecture may be complex and limit the operation of clock frequency. As will be described below, some embodiments may provide a hardware solution that is able to provide reordering without the disadvantages of, for example, CAM based approaches.

Some embodiments have a reordering mechanism provided by a transaction reordering unit (TRU). In this regard, reference is made to FIGS. 2 to 5 which show a TRU according to some embodiments. The TRU of some embodiments is configured to manage a reordering queue using a virtual index mechanism. The TRU may be configured to map virtual indexes on a dedicated protocol signal to be propagated through the interconnect 4 with request traffic and retrieved back by the interconnect on the response interfaces.

Figure 2:
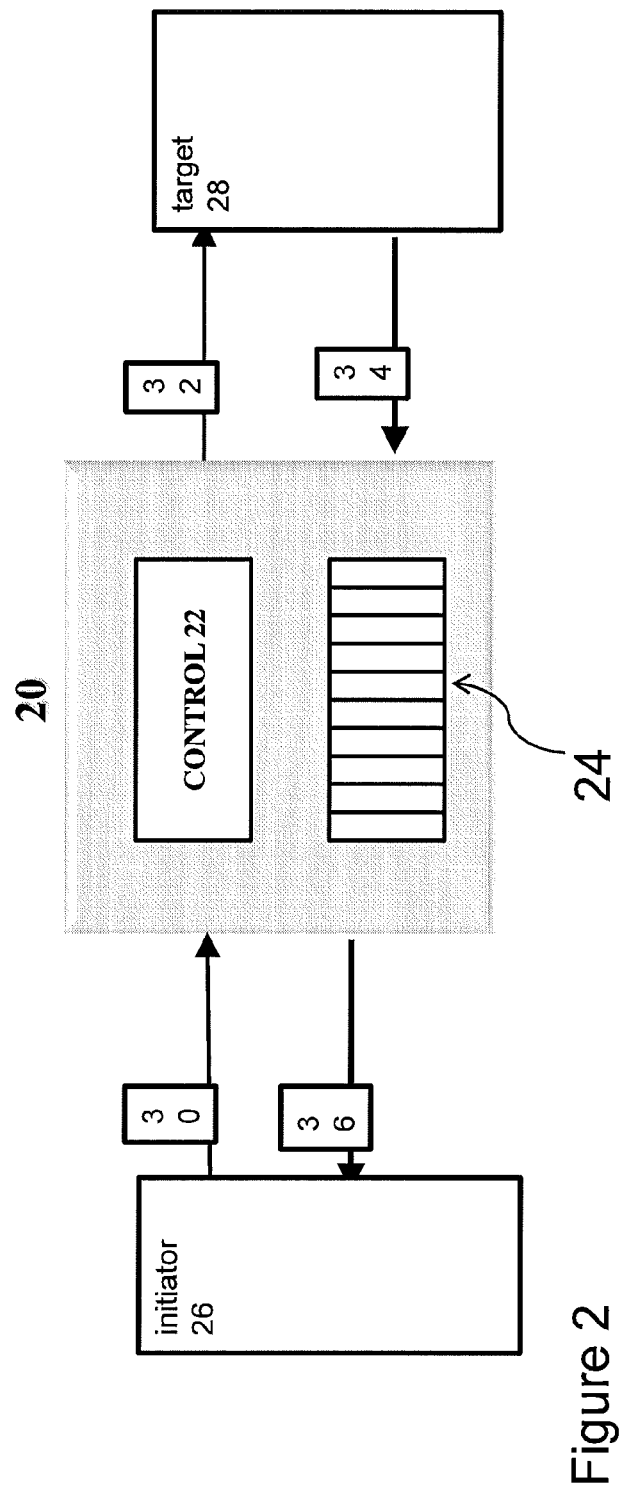
FIG. 2 shows schematically a transaction reordering unit according to an embodiment.

The arrangement shown in FIG. 2 includes a TRU 20. The TRU 20 includes a controller 22 and a queue 24. The TRU 20 is placed between an initiator 26 and a corresponding target 28. In the context of the arrangement shown in FIG. 1, the initiator 26 may be one of the masters and the target 28 may be one of the slaves. However, it is appreciated that embodiments can be used with any appropriate initiator and responder.

The queue 24 has N locations and is arranged on the response path. Each queue location has a queue locator index. The response is provided by the target 28, in response to a request from the initiator 26. A virtual index is associated with each queue location. Both the queue locator index and the virtual index are numbered from 0 to N−1. The initiator 26 is arranged to issue request transactions 30 which are sent to the TRU 20. The controller 22 of the TRU 20 establishes in which virtual location a corresponding response transaction is to be placed when that corresponding response is received by the TRU 20. The number of locations required to store the response transaction may be dependent on the transaction size. The location may be determined according to an incremental approach. Starting from previous information, a virtual index will be associated with the request transaction and will be sent with the transaction itself. In other words, the TRU will send the issued request transaction, received from the initiator 26, to the target 28 with the addition of the virtual index. The target 28 is configured to process the request and provide a response thereto. The response transaction will include the virtual index which has been added by the TRU 20. The response 30 is received by the TRU. That response will be placed in the queue in the associated location identified by the virtual index of the response transaction itself.

When information or data is written into the queue head, that data or information is sent out and at the same time the remaining queue content is shifted left in the arrangement of FIG. 2. When the TRU is first used, virtual location X (virtual index X) will correspond to physical location X (queue location index X) of the queue. However, after having done K shifts of the queue content, virtual location X (virtual index X) will be associated with physical location X-K (queue location index X-K)

The queue head is always at the location which corresponds to physical location 0 regardless of how many shifts have been performed. The number of shifts K is wrapped according to the queue size. For example, if the queue has N=16 locations, K will be incremented from 0 to 15 in a circular fashion, e.g. 0, 1, 2 . . . 15, 0, 1, . . . .

The controller 22 of the TRU is configured to stop request traffic flow if there is not enough room in the queue to contain the response to the current request transaction. Thus, the arrangement shown in FIG. 2 allows the response transactions output by the TRU 20 to be in the same order as the requests from the respective initiator 26. In some embodiments, the queue structure used in the TRU may not require an associative approach as reading is always performed from the head as with a traditional FIFO (first in first out) and writing can be done at every location.

Figure 3:
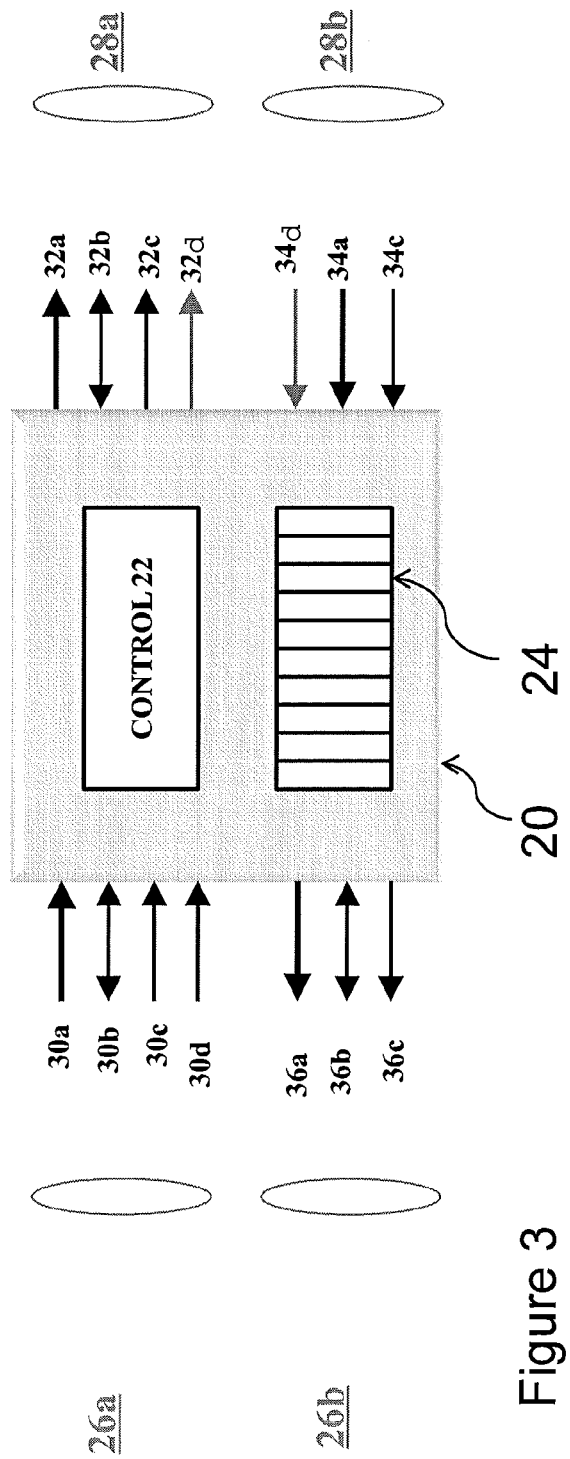
FIG. 3 shows the transaction reordering unit of FIG. 2, with some of the signals according to an embodiment.

Reference is now made to FIG. 3 which shows the signaling of the arrangement of FIG. 2 in more detail. In particular, in FIG. 3, four interfaces are shown. A request initiator interface 26a and a response initiator interface 26b are shown on the initiator side and represent the master. These two interfaces 26a and 26b may define the interface with the source. A request target interface 28a and a response target interface 28b are shown for the responder 28 and correspond to the slave block. The request target interface and target response interface may define an interface to the target.

The request and response interfaces on each side may be separate interfaces or may be provided by a common interface which provides the request and response interface functions.

The four interfaces shown are configured to be independent of the protocol. For this reason, the TRU 20 may be completely protocol agnostic. In other words, the TRU 20 may be used with a number of different protocols without specific modification.

The information which is part of the transaction requests is shown in more detail in FIG. 3. The transaction request includes data 30a, flow control signals 30b, end of transaction signal 30c, and transaction size information 30d. Flow control signals are generally used by protocols and may be request/grant signals. The end of transaction signal will indicate the end of the transaction whilst the transaction size information provides the transaction size. This information shown in FIG. 3 is typically provided in a number of protocols. The information which is sent by the TRU 20 to the request target interface 28a includes data 32a, flow control signals 32b, end of transaction information 32c, and the virtual index 32d. As mentioned previously, the virtual index is associated with a particular transaction and is added to the transaction by the controller 22. The virtual index is transported with the transaction by the interconnect.

The response target interface 28b provides a response transaction including data 34a, end of transaction information 34c, and the index information 34d which is provided in or with the request transaction.

The TRU provides a response to the response initiator interface 26b including data 36a, flow control signals 36b, and end of transaction information 36c. The virtual index has been removed from the response by the TRU.

Protocols generally have some user defined signals which can be employed to describe transport custom information. In some embodiments, the virtual index is provided in one of these user defined fields. In alternative embodiments, the virtual index may be mapped onto the protocol signal used to identify the master. In other words the source identity part of the signaling may be modified to include the virtual index additionally or alternatively. Before the response transaction is sent by the TRU to the initiator, the source identity part is modified back to its original value. It should be appreciated that the virtual index can be added to the request transaction at any other suitable location, with the TRU removing the virtual index information in the response transaction before sending that response back to the initiator.

The controller 22 is configured to handle the response queue writing and reading, manage the flow control on all the interfaces, and generate the virtual indexes.

Figure 4:
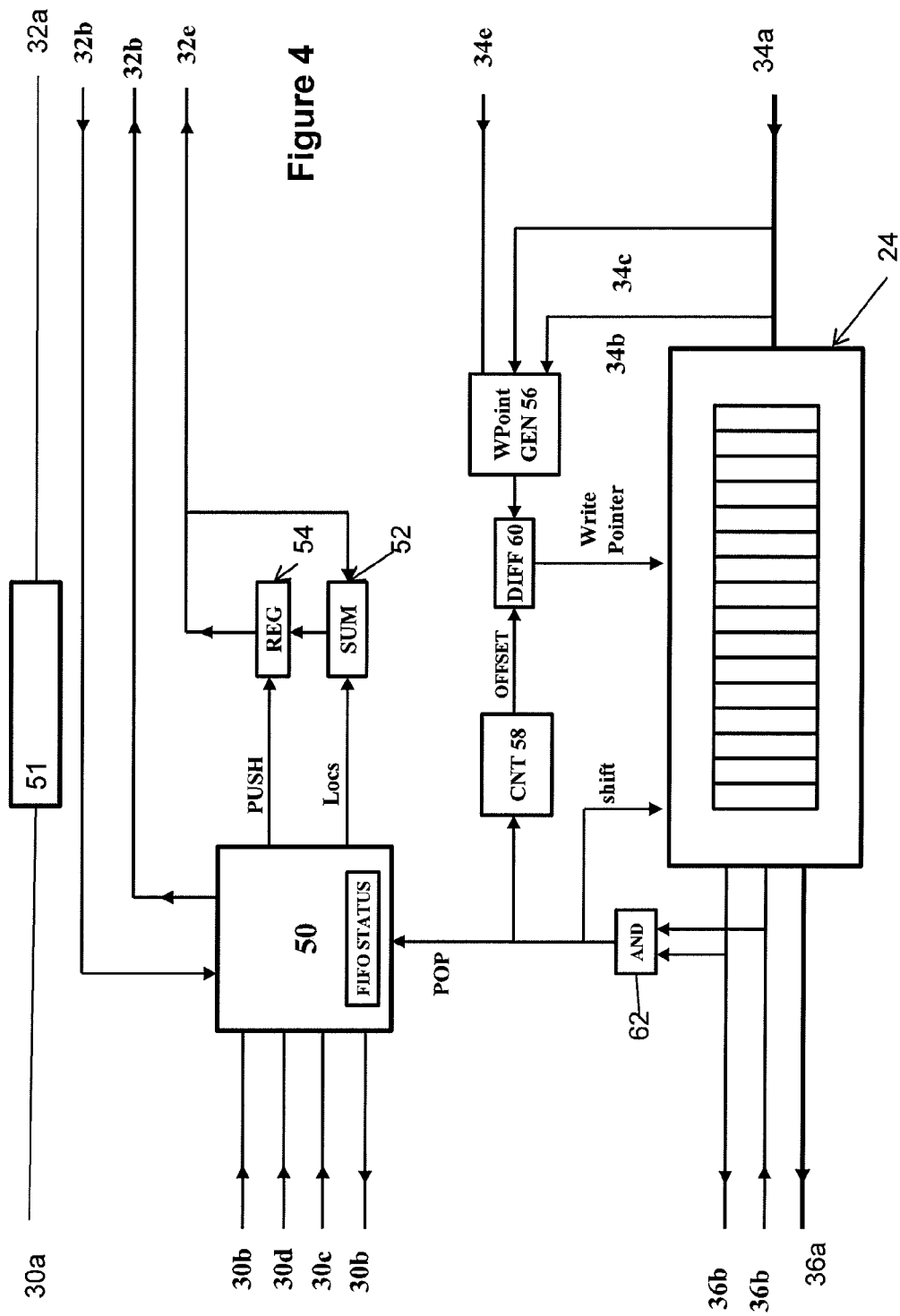
FIG. 4 shows the transaction reordering unit of FIG. 2 in more detail according to an embodiment.

Reference is now made to FIG. 4, which shows in more detail the TRU unit. In the arrangement shown in FIG. 4, the controller includes a FIFO allocator 50. The FIFO allocator 50 may take any suitable form and may, for example, be a state machine. The FIFO allocator 50 handles the control of the master and slave interfaces and generates the virtual indexes for association with the request transactions. The flow allocator 50 also manages a state variable to know at each point in time the available room in the response queue.

If the size required for the response to the request transaction (determined from the size signal 30d) received on the master request interface is smaller than the room in the queue, the whole transaction will be granted and a grant signal 30b is asserted by the FIFO allocator 50. The transaction may also receive a request signal 30b. The request and grant signals 30b are flow control signals. The grant signal is provided from the FIFO allocator 50 to the request initiator interface. The FIFO allocator 50 is arranged to receive the request data 30a, and the end of transaction (EOT) signal 30c. The end of transaction signal may be an end of packet signal.

If the request transaction is smaller than the room in the queue, a push signal will be asserted and the number of locations needed to contain the response to the previous request transaction is set on the Locs signal. The virtual index to be associated with the current request transaction is the sum of the previous virtual index allocated to the preceding request and the number of locations consumed by the previous transaction. This calculation is performed by sum block 52. A register 54 is provided. The register 54 is arranged to receive the PUSH signal output from the FIFO allocator and the output from the sum block 52. The output from the sum block is the virtual index for the received transaction and the PUSH signal causes the virtual index to be output from the register as signal 32e to accompany the transaction. The register 54 is configured so that the virtual index is mapped onto the target signal the clock cycle after the PUSH signal is asserted. The EOT signal 30c allows the FIFO allocator 50 to identify the end of a transaction and to thereby identify the next transaction as a new transaction.

The data of the transaction is received by a register 51, which holds the data and then outputs the data at the same time as the virtual index. The request data on the slave side is the retimed version of the request data on the master side.

In an embodiment, the same virtual index is used for all parts of the same transaction. However, in some alternative embodiments, different parts of the same transaction may have a different virtual index, with the virtual index for the parts being incremented by one.

The FIFO allocator 50 is also configured to generate the transaction request signal, which is presented to the target and also to receive the target grant signal from the target. These signals may be the flow control signals 32b of FIGS. 3 and 4.

The controller also includes a write point generator 56, which controls a generation of the pointer used for writing to the queue. On the first response transaction, it propagates the received virtual index. The write point generator also receives the end of transaction data 34c and the request flow control signal 34b. For subsequent transactions, the write point generator increments the previous point by one. Thus transaction k will have the pointer value equal to the virtual index plus k. It should be appreciated that where elements or parts of a transaction have their own virtual index, the write pointer will be incremented for each element of the transaction.

The counter block 58 and difference block 60 are provided in order to manage the association between the virtual index and the physical queue index. At the beginning, the queue 24 is empty and the counter 58 is set to 0. The offset value provided by the counter 58 to the difference block will be 0. The output of the write pointer generator is input to the difference block. The output of the difference block 60 provides the write pointer. Initially the write pointer has a value generated by the write point generator. In this case, the virtual queue location will correspond to the physical one. After a transaction or a transaction element has been read from the queue, the counter output is equal to the number of read operations and provides an offset value. The difference block 50 calculates the write pointer as the difference between the write pointer output and the offset provided by the counter 58. In this way, the virtual location X can be associated with the physical location X-K as discussed previously. It is appreciated that the response data is written into the queue at the location to which the write pointer points as offset by the count value.

Offset wrapping is provided by the counter 58. When an element is read from the queue, an output is provided to both the counter 58 and the FIFO allocator 50. An AND gate 62 is provided between the output of the queue on the one hand and the FIFO allocator and the counter on the other hand. The output of the AND gate also provides the queue shift signal. The AND gate receives the request and grant signals 36b. When both of these signals are asserted, this means that an element has been read from the queue. The FIFO allocator 50 will update its internal FIFO status. The queue is shifted as the shift signal output by the AND gate 62 is asserted. The output of the queue includes the response data 36a.

As mentioned previously, the same virtual index may be associated with all elements of a transaction or different elements of a transaction may have different indexes. In the latter case, the logic used to handle the queue write pointer may need to be modified.

Figure 5:
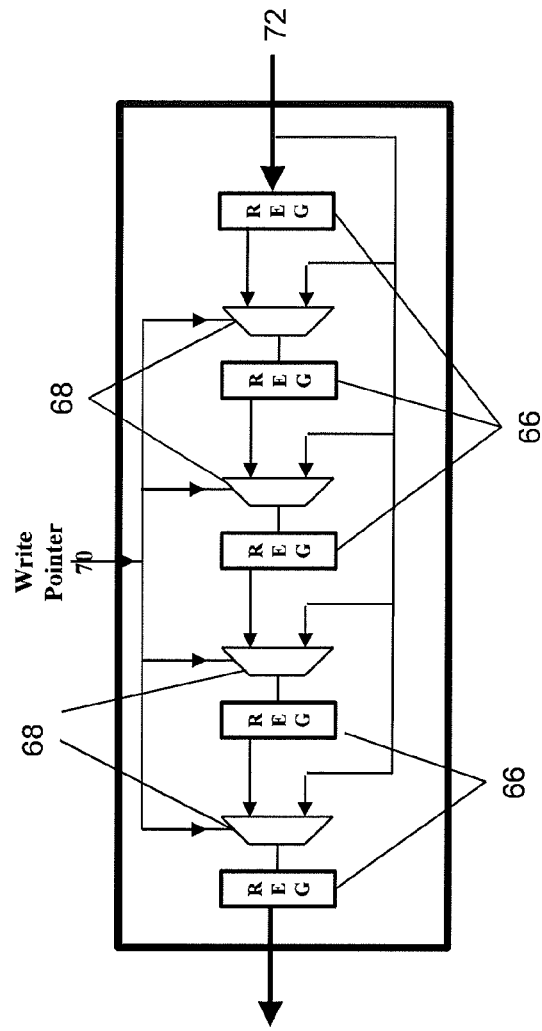
FIG. 5 shows one example of a queue structure according to an embodiment.

Reference is made to FIG. 5, which shows one example of a queue which can be used in one or more embodiments. For example, the FIFO queue may include n registers 66 and n multiplexors 68, where n is the queue size. Each multiplexor 68 is arranged to receive a control signal from the write pointer. Each multiplexor 68 is coupled on its output to an associated register 66, which represents the queue storage location. Each multiplexor 68 is arranged to be coupled on one of its inputs to the received data. Each multiplexor 68 is configured to be coupled to the preceding register. Data which is received from the target is written into one of the registers. This will be controlled by the write pointer, which will cause one of the multiplexors to write the received data into the correct queue location (i.e. register). When the data in the register 66 at the top of the queue is read out, the multiplexors 68 are configured to allow the data in the registers coupled to their input to be output to the next register 66. In this way the data is shifted through the queue one position at a time as the data is read out.

The arrangement shown in FIG. 5 includes an example of a queue structure which may be used in embodiments. In alternative embodiments, other structures may be used.

It is appreciated that the master may in some embodiments alternatively be any other source of transactions. Likewise in some embodiments, the slave may alternatively be any other target for transactions, such as another master.

Figure 6:
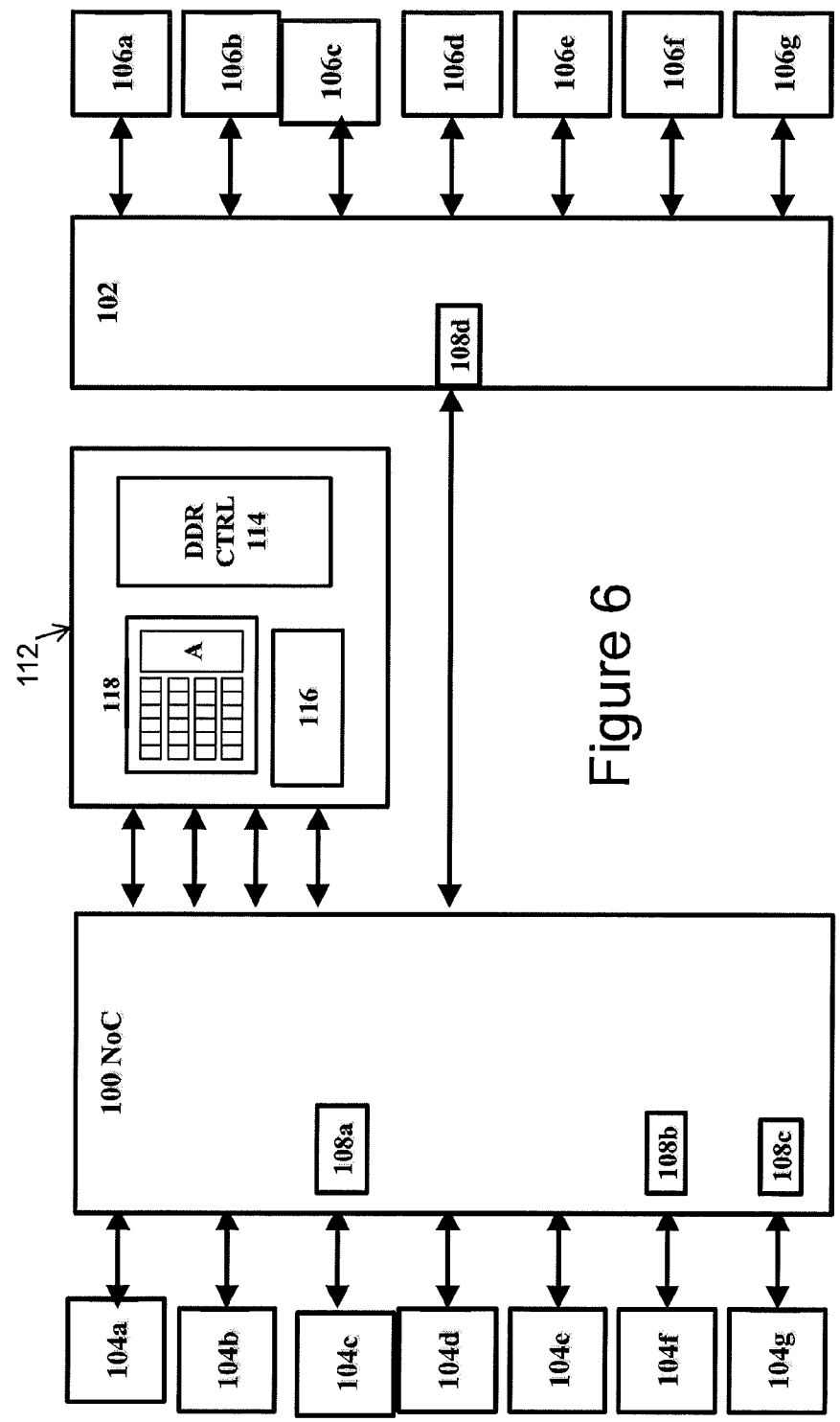
FIG. 6 shows schematically architecture used in an integrated circuit according to an embodiment.

Reference is now made to FIG. 6, which shows a system architecture used in an integrated circuit approach according to an embodiment. In the architecture of FIG. 6, a NoC environment 100 is provided. The NoC environment is coupled to masters 104a to 104g. The masters may include one or more of the following masters in addition to or instead of the masters mentioned earlier:

CPU (central processing unit); decoder; transport stream unit; encoder; video data processor; and graphic processing unit.

The masters 104a to 104g are arranged to be coupled to the NoC environment 100. The NoC environment 100 is coupled to a bus or circuit switched environment 102. The bus 102 is coupled to slaves 106a to 106g. The slaves may include one or more of the following slaves in addition to or instead of the slaves mentioned earlier:

External memory interface; peripheral component interface; memory; RAM, registers; target TRG.

As mentioned previously, the different masters may use different protocols.

A memory controller 112 is provided which is coupled to the NoC environment for ensuring the reordering of responses to requests. The memory controller 112 is used to access an external memory and has a memory scheduler 118 and DDR controller 114. For improved memory performance, the transactions may be presented out of order to the memory. In this example, the memory is a target that receives requests from an initiator. A response FIFO 116 is provided which is arranged to reorder the responses to the requests.

The memory scheduler 118 in some embodiments schedules the received requests to be serviced by the external memory in an order with the greatest efficiency for the memory. The response FIFO can therefore in such embodiments store the responses generated by the external memory in the order in which the corresponding requests were received by the memory scheduler. The reordering is therefore carried out at the target side. The reordering corresponds to order in which the requests were received.

As the reordering is done at the target side each master 104a to 104g waits for the completion of previous requests. However, this reordering at scheduler level may affect latency for the masters. It may then be better to stall single masters independently rather than reordering at the scheduler level.

As can be seen, some of the masters have filters 108a to c associated therewith. As mentioned each master may operate according to a different protocol, for example, 104c may operate in accordance with a proprietor's own protocol while master 104f may operate in accordance with OCP (open core protocol) and master 104g operates in accordance with AMBA AXI (Advanced Microcontroller Bus Architecture-advanced extensible interface). Once again, it is appreciated that this is by way of example only.

Each protocol can have its own reordering requirements of which filters 108a, 108b and 108c can respectively carry out. A bus transaction issued by the master may include an address (to identify a target) and a source/identifier src/id in a request. Each filter 108a to c determines whether to block a request until the response to a previous request is received based on the target and src/id in the request. For example certain requests may not have an in-order requirement and the filter will allow those requests through before the response to a previous request has been received. Other requests may be required in order and the filter may only pass the request through when a response to a previous request has been received.

For example filter 108a may pass a first request with an identifier '7' to target 106b from master 104c. A next request from master 104c may be for target 106g with an identifier of '7'. The filter may block this request until the response for the previous request is received because both requests have the same identifier '7'. A third request may be for target 106a with an identifier of '8' and may be passed through the filter as there is no requirement with this identifier for in-order operation.

In this manner, the filters 108a-c prevent the issuance of at least some requests until the response to the previous transaction has been received. A filter 108d may be provided in the bus 102 for maintaining the order of the received transactions from the NoC interconnect 100. These filters may limit the performance of those blocks where performance gains are provided by the out of order processing of transactions.

This may lead to different side effects such us system latency increase, drop of efficiency on memory interfaces, drop of efficiency on interconnect.

Some embodiments may address or mitigate one or more of the above issues by means of a system architecture which allows slaves and an interconnect to work in a full out of order context. Such an approach may remove the need to perform filtering at interconnect level on request traffic and to implement reordering mechanism at slave level.

Figure 7:
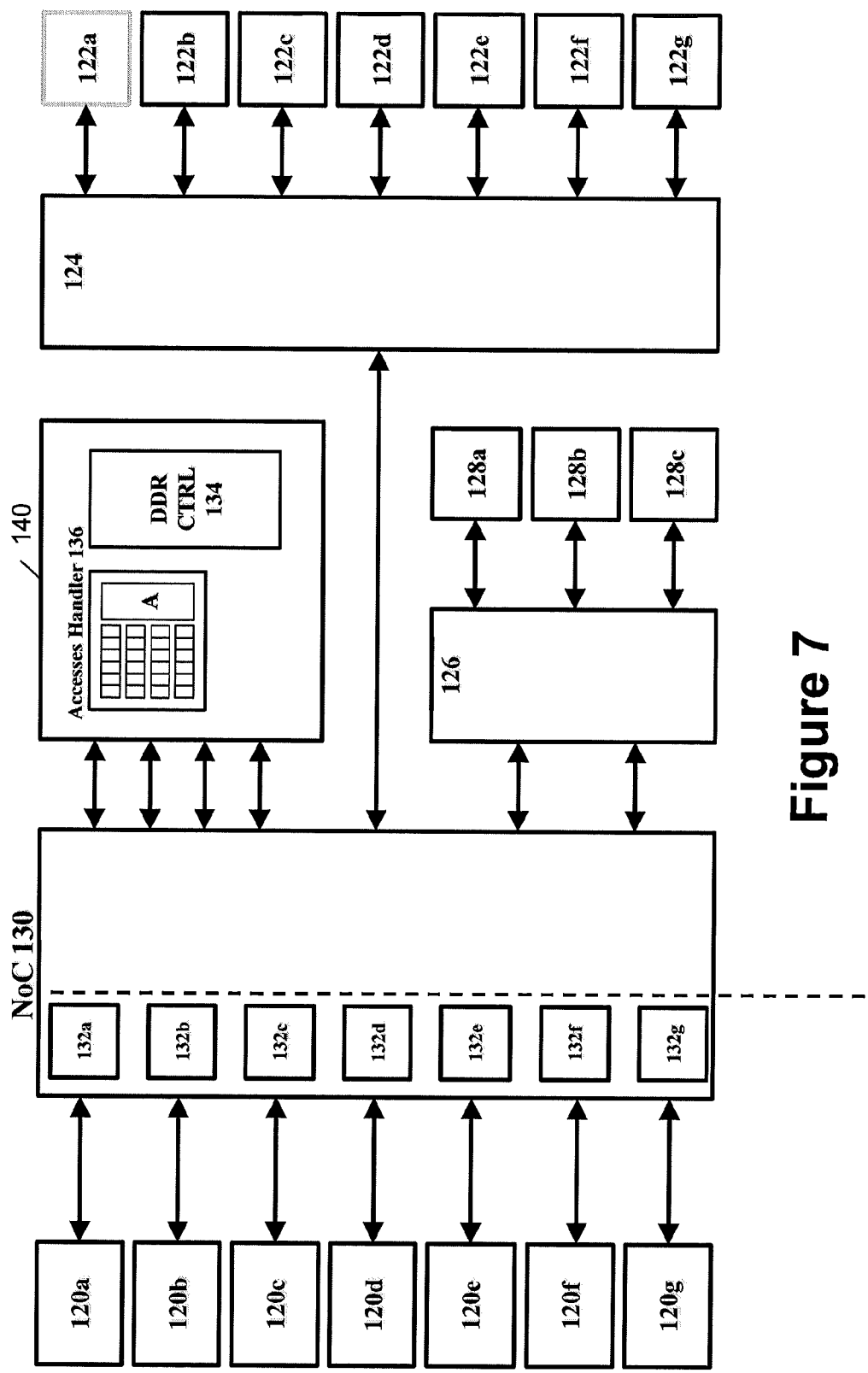
FIG. 7 shows schematically a second architecture used in an integrated circuit according to an embodiment.

Reference is made to FIG. 7 which shows an architecture according to an embodiment. As with the arrangement shown in FIG. 6, a number of masters 120a-g and slaves 122a-g may be provided. The masters may include one or more of the masters mentioned previously or any other master. The slaves may include one or more of the slaves mentioned previously or any other slave.

The masters are again arranged to send request transactions to a NoC interconnect 130 and receive responses thereto via the NoC interconnect. The NoC interconnect 130 is coupled to a circuit switched environment or a bus 124. The slaves are coupled to the bus to receive requests from the bus and put responses to the requests onto the bus.

In the arrangement of FIG. 7, a second subsystem includes a further bus 126 which to which first to third slaves 128a-c are coupled. The second subsystem operates in a similar manner to the first subsystem defined by the bus 124 and the slaves coupled thereto.

As with the arrangement of FIG. 6, a controller 140 is provided for controlling access to a memory (the responder). The controller 140 has a request access scheduler 136 which is configured to control the order in which the requests are presented in order to improve the operating efficiency of the memory. The DDR controller 134 controls access to the memory in accordance with the scheduling of the request access scheduler.

As compared to the arrangement of FIG. 6, the controller 140 does not require a reordering FIFO or any other reordering functionality. The filters provided in the NoC and the bus are also omitted. In contrast a TRU 132a-g is provided for each master. Thus each master has its own TRU. Alternatively masters operating with the same protocol may share a TRU.

The TRUs 132 may be as previously described or may have a different construction. The TRUs may be provided in the interface with the NoC interconnect or in the NoC itself. The TRUs 132 are configured to reorder the responses to the requests such that they are provided to the master in the same orders as the corresponding requests. This means that on the side or interface of the TRU which communicates with the master order is maintained. On the side or interface of the TRU which outputs the requests to be routed to the slaves, an out of order environment is provided.

Thus, in some embodiments, some limitations on the memory subsystem may be removed achieving then a performance improvement in terms of bandwidth and latency.

In some embodiments of the application such as the embodiment shown in FIG. 7, there is no need to filter request traffic. At a DMA level, some embodiments may break the link in between src/id allocation and targets thus improving performances. In some embodiments, parallel accesses on multiple targets even for single src masters or AXI transactions using same ID may be achieved. In these embodiments, there may be no need to filter request traffic in the NoC and it may be possible to parallelize execution of transactions, whatever the ID nature of a particular protocol, on multiple slaves.

Some embodiments may ease QoS in NoC-based systems as requests disorder is permitted to support features such as virtual channels, dynamic multi-path, etc. Virtual channels may provide a virtual path between an initiator and target for high priority requests and require a full out of order operation.

In some embodiments the masters are fully decoupled from the rest of the integrated circuit. This may means that designs may be easier to reuse and simpler design (time-to-market) may be achieved. In some embodiments there is no need to provide ordering in the slaves. For example no reordering tasks may be imposed on the slaves, which may lead to one or more of the following advantages: system latency reduction, memory efficiency increase, and bandwidth increase.

The TRU may replace already embedded FIFOs on a requester's bus interface and also act as a reordering unit without requiring any additional silicon area.

It is appreciated that in some embodiments, the previously described transaction unit may be used in the system shown in FIG. 7. However, it is appreciated that in alternative embodiments, the transaction reordering unit can be provided by any other suitable unit including any of the currently known reordering units.

It is appreciated that in some embodiments, the transaction reordering unit of FIGS. 2 to 5 may be used in positions other than that described in relation to FIG. 7. For example, the transaction reordering unit may be used in the access handler block of FIG. 6 or at any other suitable position in the integrated circuit.

In the above described arrangements, reference has been made to a transaction reordering unit. However, these transaction reordering units are only some examples of a transaction reordering arrangement of some embodiments. In alternative embodiments, the transaction reordering arrangement may take any other suitable form.

In some embodiments, the requests issued by a source may be a transaction, an element of a transaction or any other suitable request.

The source may be a master or any other suitable source of requests. The destination of the requests may be a slave or any other suitable destination.

Although the requestors or masters of the foregoing description have been described using different protocols, it will be appreciated that they may use the same protocol. In embodiments some requestors may have the same protocol and others different protocol.

It is appreciated the protocol used by a masters may determine the order in which responses to the requests may be received. This protocol may be a bus protocol.

It is appreciated that the integrated circuit of the foregoing may be replaced by any suitable arrangement. It is appreciated that the transaction reordering unit of the foregoing description may be replaced by any suitable transaction reordering arrangement. It is appreciated that the network on chip of the foregoing may be any suitable interconnect. It is appreciated that the master or requestors of the foregoing description may be any suitable source and that the slave may be any suitable responder.

Furthermore, referring to FIG. 7, at least one of the masters 120, slaves 122, and NoC 130 may be a controller such as a processor.

Whilst this detailed description has set forth some embodiments, other applications and configurations are contemplated.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A transaction reordering arrangement, comprising:
a queue into which respective responses to requests are writable; and
a controller configured to control a position in said queue to which said respective responses to said requests are written such that said responses are read out of said queue in an order which corresponds to an order in which said requests are issued;
wherein said controller is configured to add respective index information to said requests received via said first interface such that said requests output by said second interface comprise said index information; and
wherein said controller is configured to remove said index information from said response after being received and before placed into said queue.

2. An arrangement as claimed in claim 1, comprising:
a first interface configured to receive said requests from at least one source of said requests and to provide said responses to a respective one of said at least one source; and
a second interface configured to output said requests to at least one responder and to receive said responses from a respective one of said at least one responder.

3. An arrangement as claimed in claim 1, wherein said controller is configured to add said respective index information to at least one of a custom information field and a source identification field of said request.

4. An arrangement as claimed in claim 1, wherein said controller is configured to use said index information in said response to control the position in said queue to which said response is written.

5. An arrangement as claimed in claim 1, wherein said controller is configured to control a mapping between said index information and a position in said queue.

6. An arrangement as claimed in claim 1, wherein said queue is configured such that said responses are read out of said queue from a head of said queue.

7. An arrangement as claimed in claim 5, wherein said controller is configured to provide a write pointer using said index information and information indicating a number of responses read out of said queue.

8. An arrangement as claimed in claim 7 wherein when a response is read out of said queue, the contents of said queue are shifted towards the head of said queue.

9. An apparatus, comprising:
a response input node configured to receive in a receive order responses to requests issued in an issue order that is different from the receive order;
a response output node; and
a queue coupled to the response input and output nodes, configured to store the received responses in the issue order, and configured to provide the received responses to the output node in the issue order.

10. The apparatus of claim 9 wherein the queue includes a first-in-first-out buffer.

11. The apparatus of claim 9, further including a load circuit coupled to the response input node and configured to load the received responses into the queue such that the queue is able to provide the received responses to the output node in the issue order.

12. The apparatus of claim 9, further including a load circuit coupled to the response input node and configured to load the received responses into the queue such that the queue stores the responses in the issue order.

13. The apparatus of claim 9 further including a load circuit coupled to the response input node and configured to load the received responses into the queue in the receive order.

14. The apparatus of claim 9 further including:
a request input node configured to receive the requests in the issue order;
a request output node; and
an allocator coupled to the request input and output nodes, configured to generate for each request an indicator of a position of the request within the issue order, configured to combine the indicator with the request, and configured to provide the respective combined indicators and requests to the request output node.

15. The apparatus of claim 9, further including:
a request input node configured to receive the requests in the issue order;
a request output node; and
an allocator coupled to the request input and output nodes, configured to generate for each request an indicator of a position of the request within the issue order, configured to combine the indicator with the request, and configured to provide the respective combined indicators and requests to the request output node in issue order.

16. The apparatus of claim 14, further including:
wherein the response input node is configured to receive the indicators with the corresponding responses; and
a load circuit coupled to the response input node and configured to load each of the received responses into the queue in response to the respective indicator such that the queue is able to provide the received responses to the output node in the issue order.

17. The apparatus of claim 14, further including:
wherein the response input node is configured to receive the indicators with the corresponding responses; and
a load circuit coupled to the response input node and configured to load each of the received responses into the queue in response to the respective indicator such that the queue stores the responses in the issue order.

18. The apparatus of claim 14, further including:
wherein the response input node is configured to receive the indicators with the corresponding responses; and
a load circuit coupled to the response input node, configured to separate the respective indicator from each corresponding received response, and configured to load each of the received responses into the queue in response to the respective indicator such that the queue stores the responses in the issue order.

19. An integrated circuit, comprising:
a response input node configured to receive in a receive order responses to requests issued in an issue order that is different from the receive order;
a response output node; and
a queue coupled to the response input and output nodes, configured to store the received responses in the issue order, and configured to provide the received responses to the output node in the issue order.

20. The integrated circuit of claim 19 wherein the response input and output nodes include respective internal nodes.

21. A system, comprising:
at least one first integrated circuit configured to issue requests in an issue order;
at least one second integrated circuit configured to generate responses to the requests in a response order; and
at least one third integrated circuit coupled to the at least one first and at least one second integrated circuits, the at least one third integrated circuit including:
a response input node configured to receive the responses in a receive order that is different from the issue order;
a response output node; and
a queue coupled to the response input and output nodes, configured to store the received responses in the issue order, and configured to provide the received responses to the output node in the issue order.

22. The system of claim 21 wherein the at least one first, at least one second, and at least one third integrated circuits are disposed on respective dies.

23. The system of claim 21 wherein at least two of the at least one first, at least one second, and at least one third integrated circuits are disposed on a same die.

24. The system of claim 21 wherein the receive order is equal to the response order.

25. The system of claim 21 wherein at least one of the at least one first, at least one second, and at least one third integrated circuits includes a controller.

26. A method, comprising:
receiving from at least one responder in a receive order responses to requests issued by at least one requester in an issue order that is different than the receive order; and
storing the responses in an issue order and providing the responses to the at least one requester in the issue order.

27. The method of claim 24, further including generating the responses with the at least one responder in the receive order.

28. The method of claim 24 wherein:
receiving the responses includes receiving issue-order indices that respectively correspond to the responses; and
providing the responses includes:
determining a respective pointer for each received response based on the corresponding issue-order index and on a shift of data from a queue; and
loading each received response into at least one location of the queue corresponding to the respective pointer.

29. The method of claim 24, further including:
receiving from the at least one requester the issued requests;
generating for each request a corresponding issue-order index that indicates a position of the request within the issue order; and
providing the requests and the corresponding issue-order indices to the at least one responder.

* * * * *

UNITED STATES PATENT AND TRADEMARK OFFICE
CERTIFICATE OF CORRECTION

PATENT NO. : 8,677,045 B2  
APPLICATION NO. : 13/241874  
DATED : March 18, 2014  
INVENTOR(S) : Daniele Mangano and Ignazio Antonino Urzi Page 1 of 1

It is certified that error appears in the above-identified patent and that said Letters Patent is hereby corrected as shown below:

In the specification:

Column 1, line 9, after "entirety." and before "This" insert the subtitle --RELATED APPLICATION DATA--.

In the claims:

In claim 27 at column 14, line 20, "claim 24" should read --claim 26--.

In claim 28 at column 14, line 23, "claim 24" should read --claim 26--.

In claim 29 at column 14, line 33, "claim 24" should read --claim 26--.

Signed and Sealed this  
First Day of July, 2014

Michelle K. Lee  
*Deputy Director of the United States Patent and Trademark Office*